United States Patent [19]

Jangaard

[11] 4,002,377
[45] Jan. 11, 1977

[54] SEALED BEARING FOR LOAD CARRYING BOOMS

[75] Inventor: Sverre Jangaard, Alpine, Calif.

[73] Assignee: Campbell Industries, San Diego, Calif.

[22] Filed: July 31, 1975

[21] Appl. No.: 600,268

[52] U.S. Cl. .................................. 308/36.1; 212/70
[51] Int. Cl.² ............................................ F16C 1/24
[58] Field of Search ................... 308/3 R, 2 R, 36.1, 308/36.2, 36.3; 212/28, 70; 214/1 BC, 1 BD, 132, 151

[56] References Cited

UNITED STATES PATENTS

| | | | |
|---|---|---|---|
| 2,872,217 | 2/1959 | May | 308/36.1 X |
| 3,097,024 | 7/1963 | Jones et al. | 308/36.3 |
| 3,401,990 | 9/1968 | Savins | 308/36.3 |
| 3,565,447 | 2/1971 | Joachim et al. | 308/36.1 X |
| 3,718,209 | 2/1973 | Moslo | 308/36.1 X |

Primary Examiner—Joseph F. Peters
Assistant Examiner—Gene A. Church
Attorney, Agent, or Firm—Brown & Martin

[57] ABSTRACT

A boom is mounted for pivotal movement about two orthogonal axis. Rotation about the horizontal axis is provided by a sealed boom pivot bearing utilizing a floating bearing pin in an oil filled enclosure. Vertical loads and side thrust forces are accommodated by a second sealed bearing utilizing a bearing post received in a cylindrical bearing enclosure. Vertical thrust is absorbed by a sliding bearing relationship between the bottom of the bearing post and an end plate on the cylindrical enclosure. Side thrust is accommodated by a sliding bearing relationship with the walls of the enclosure. A supplemental vertical thrust bearing is provided at the upper end of the cylindrical enclosure.

7 Claims, 7 Drawing Figures

SEALED BEARING FOR LOAD CARRYING BOOMS

BACKGROUND OF THE INVENTION

Booms are commonly employed in lifting and transporting a load. When utilized for this purpose, the booms are provided with an end bearing capable of providing for rotation of the boom in two axes and of absorbing the vertical and horizontal loads imposed. In shipboard applications, such bearings are known as gooseneck bearings. On a tuna fishing vessel, a main boom is utilized for net handling. Additionally, a cargo and brailing boom is utilized to brail fish from the nets and to unload cargo aboard the vessel. The booms in all such vessel applications are located above deck and thereby subject the associated bearing to the severe marine environment. According to conventional practice, the various bearing surfaces in gooseneck bearings are provided with grease fittings and packed with grease in an attempt to exclude salt and other contaminates. However, the demands of daily use, in conjunction with the penetration of contaminants, frequently destroy the effectiveness of the lubrication and causes metal to metal contact between the bearing surfaces. The high loads that may be carried by such booms in combination with the reduced lubrication effectiveness may ultimately cause bearing failure. A load carried on the boom acts through a relatively long lever arm and produces sufficient moment to cause failure of the main bearing structural components, such as the boom swivel pin, or boom heel pin. Such failure is a potential safety hazard, in addition to being an expensive interruption of critical vessel tasks.

It is therefore an object of the invention to provide a new and improved apparatus for supporting the end of a load carrying boom in a bearing structure that is sealed against the admission of deleterious elements

SUMMARY OF THE INVENTION

In an exemplary embodiment of the invention, the sealed bearing structure replaces a conventional gooseneck bearing in a tuna vessel application. The device is configured with two main bearing structures.

The first bearing structure is a boom heel bearing for rotation of the boom about a horizontal axis. The second bearing is a boom swivel bearing for rotation of the boom about a vertical axis. The boom end incorporates a pair of boom heel flanges having aligned horizontal bores. The horizontal bores on the boom heel flanges correspond to horizontal bores in the gooseneck flanges that connect between the boom heel bearing and boom swivel bearing. A boom heel pin connects between the boom heel flanges and gooseneck flanges for relative rotation and for transferring loads. The boom heel pin is fitted within a sealed and oil filled bearing enclosure. The pin is freefloating so that it wears uniformly and provides a uniform bearing action. The oil in which the pin is immersed provides lubrication between the bearing surfaces and prevents the admission of contaminants. The bearing enclosure is formed by end plates over the ends of the pin, by a sleeve extending between the heel flanges, and by an O-ring seal between the heel flanges and gooseneck flanges.

The boom swivel bearing comprises a cylindrical casing with an end plate enclosing the casing to form a bearing enclosue. A boom swivel post is fitted within the cylindrical casing and rests on the end plate. Vertical loads are absorbed between the bottom of the post and end plate of the enclosure, whereas the side thrusts are transferred to the walls of the cylindrical casing. The post is capped by a top plate which mounts between the post and the gooseneck flanges. The top plate overlies the upper edges of the cylindrical casing and has a depending skirt to cooperate with the exterior walls of the casing, and an O-ring seal to complete the enclosure, so that the interior of the bearing enclosure may be oil filled.

A supplemental bearing is provided to accommodate failures or overloads of the primary vetical thrust bearings. The supplemental bearing comprises a thrust ring secured to the top plate for rotation with the top plate. A thrust ring is positioned for engagement with the upper edges of the cylindrical casing.

It is therefore an object of the invention to provide a new and improved sealed bearing for supporting a load carrying boom.

It is another object of the invention to provide a new and improved sealed bearing that is of high strength and load carrying capability.

It is another object of the invention to provide a new and improved sealed bearing having large bearing areas.

It is another object of the invention to provide a new and improved sealed bearing that is easily maintained.

It is another object of the invention to provide a new and improved sealed bearing that provides oil immersed bearing surfaces in two axes.

It is another object of the invention to provide a new and improved sealed bearing that reduces the possibility of bearing failure.

It is another object of the invention to provide a new and improved sealed bearing with reduced bearing friction.

Other objects and many attendant advantages of the invention will become more apparent upon a reading of the following detailed description together with the drawing in which like reference numerals refer to like parts throughout and in which:

DETAILED DESCRIPTION OF THE DRAWINGS

Figure 1:
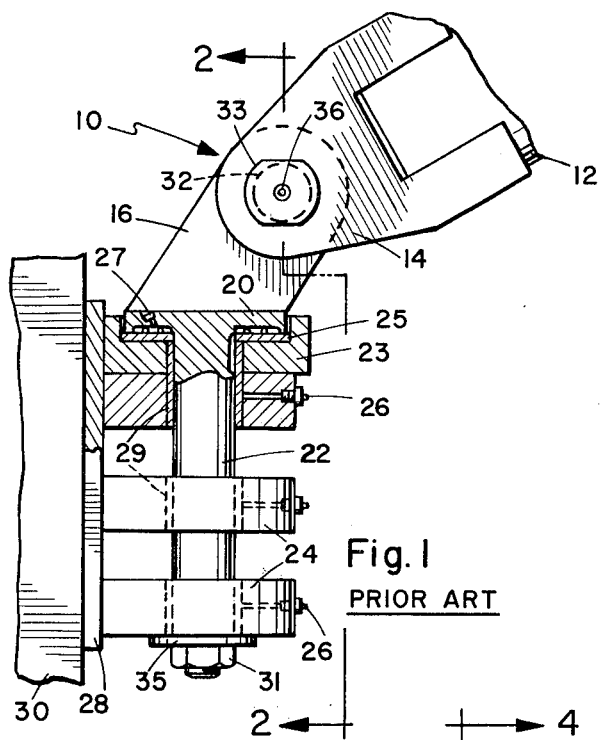
FIG. 1 is a side elevation view, partially cut away, or a prior art gooseneck bearing.
Figure 2:
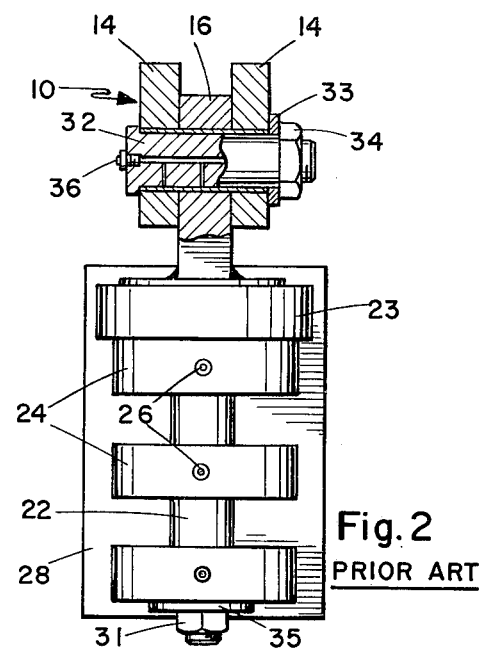
FIG. 2 is a sectional view taken on line 2—2 of FIG. 1.
Figure 3:
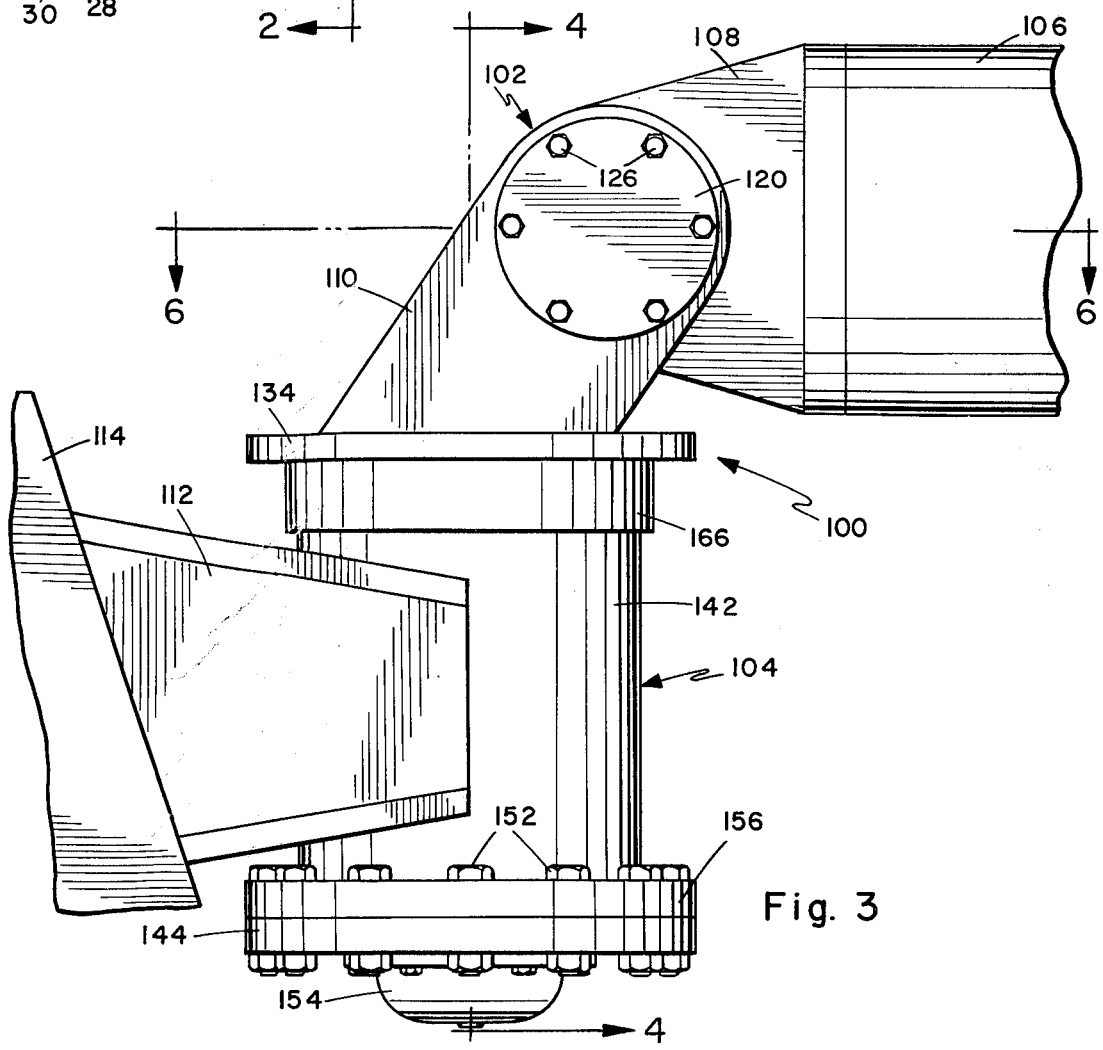
FIG. 3 is a side elevation view of the sealed bearing according to the invention.
Figure 4:
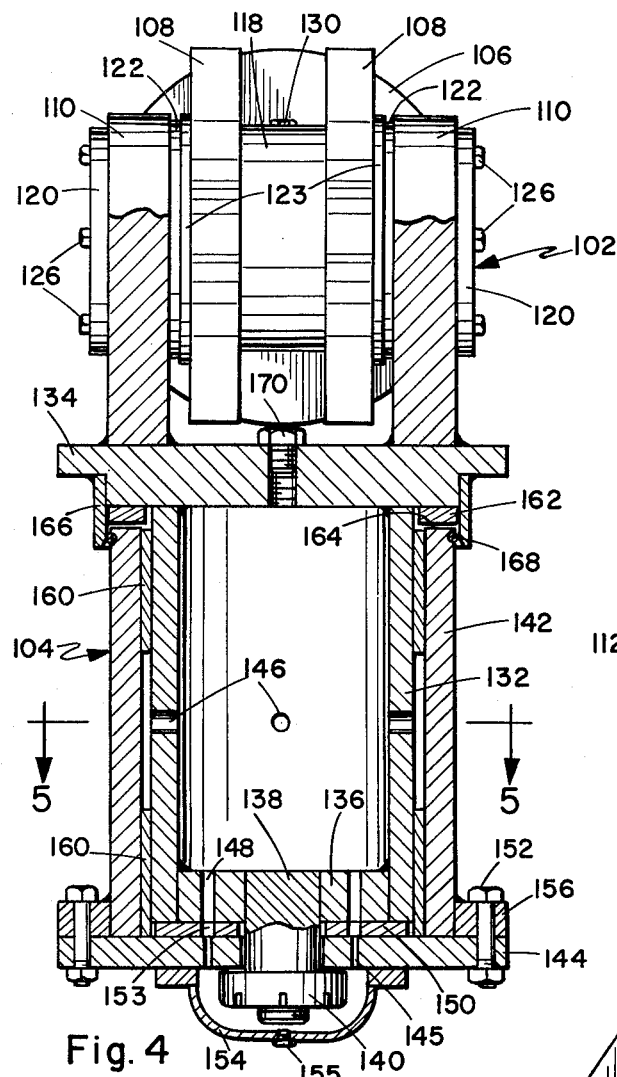
FIG. 4 is a sectional view taken on line 4—4 of FIG. 3.
Figure 5:
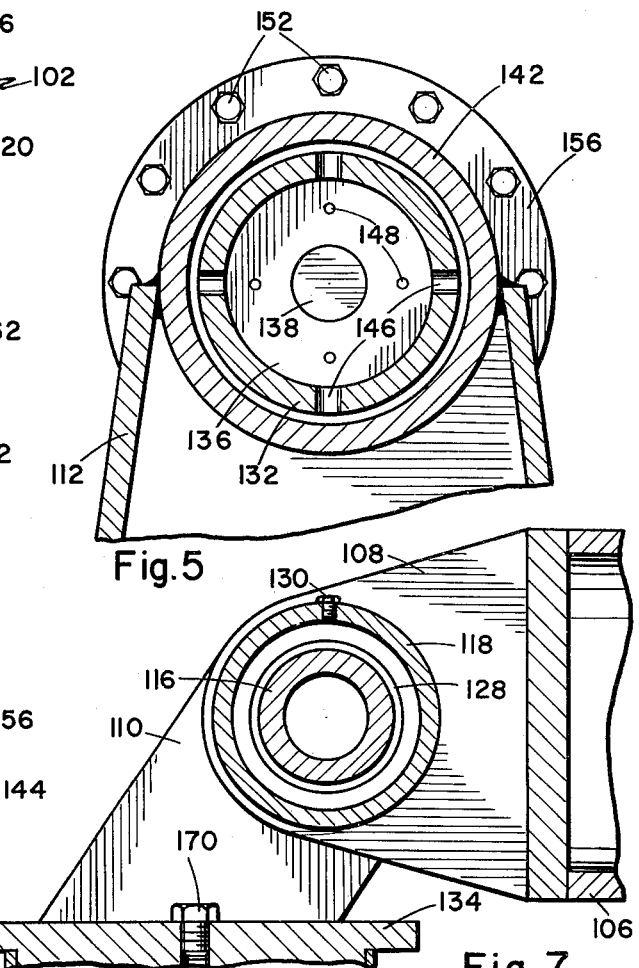
FIG. 5 is a sectional view taken on line 5—5 of FIG. 4.
Figure 7:
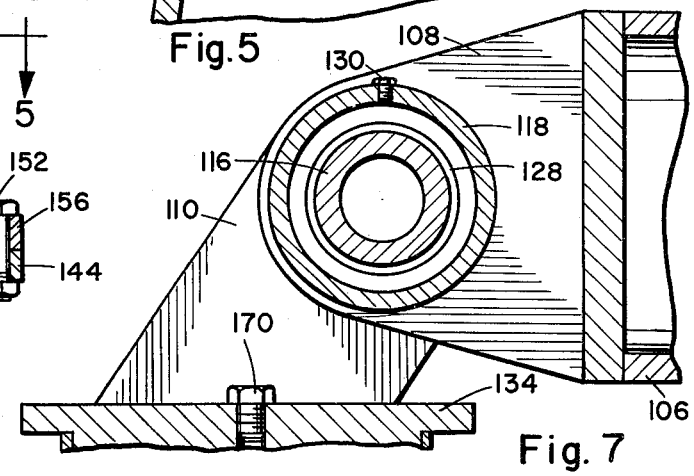
FIG. 7 is a sectional view taken on line 7—7 of FIG. 6.
Figure 6:
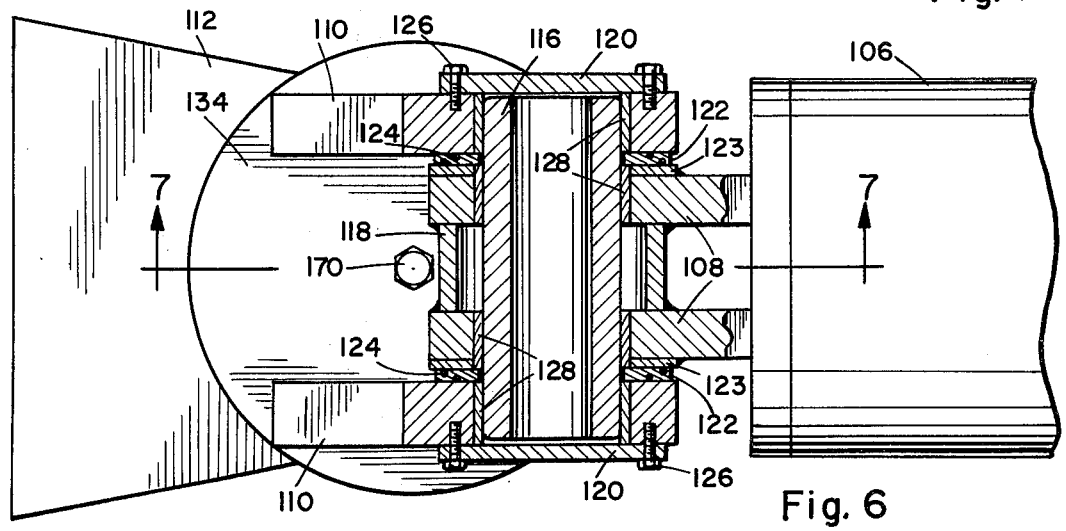
FIG. 6 is a sectional view taken on line 5—5 of FIG. 3.

Referring now to the drawings, FIGS. 1 and 2 illustrate a prior art gooseneck bearing 10. A boom 12 terminates in a heel with double flanges 14. The boom heel flanges 14 are mated with the single gooseneck flange 16 by a boom heel pin 32. The boom heel pin 32 and a bearing insert 33 are held in position by a nut 34 threaded onto the end of the boom heel pin 32. Lubrication is provided by a grease fitting 36. The boom heel pin is not free-foating and thus tends to assume a fixed position relative to the gooseneck and boom heel flanges, producing an uneven wearing and subsequent binding of the boom movement about the horizontal axis. The bearing is not sealed against the admission of water or other contaminants. Contaminants may enter from either end of the boom head pin 32 or between the flanges 14 and 16.

The prior art boom swivel bearing is provided in a plurality of boom swivel supports 24 mounted by a foundation 28 to supporting structure 30. The uppermost boom swivel support 24 includes a vertical thrust bearing support 23 that in turn carries a vertical thrust bearing insert 25. Boom swivel pin 22 has an upper flange 20 that overlies the bearing insert 25 and forms a top located vertical thrust bearing. Lubrication is provided through a grease fitting 27. Side loads are transferred from the pin 22 to the boom swivel supports 24 through bearing inserts 29. The side thrust bearings are lubricated by fittings 26. A nut 31 and washer 35 are provided to prevent the vertical removal of the swivel pin by a vertical upforce. However, the nut and washer 31 and 35 contribute a frictional effect, and provides an entry path for contaminants. Contaminates may also enter at the vertical thrust bearing and on the upper surfaces of the two lowermost boom swivel supports 24. The admission of contaminants may eventually reduce the lubrication effectiveness to the point that the bearing seizes. Such a seized bearing can cause the boom swivel pin to fail completely.

Referring now to FIGS. 3 through 7, the improved gooseneck bearing 100 according to the invention is illustrated. The gooseneck bearing 100 includes a boom heel bearing assembly 102 and a vertical thrust bearing assembly 104. The bearing 100 is supported from the vertical thrust bearing assembly by a king post mount 112. The king post mount 112 is secured to the king post structure 114. A boom 106 is connected to the boom heel bearing 102 by double boom heel flanges 108. Double gooseneck flanges 110 are also connected to the gooseneck bearing and have a mutual bearing relationship with a floating boom heel bearing pin 116. The sliding bearing relationship with pin 116 is established through bearing inserts 128. Pin 116 is housed in a bearing enclosure comprised of the aligned bores through the boom heel and gooseneck flanges 108 and 110, a sleeve 118 and end plates 120. In normal operation, the entire bearing enclosure is filled with a lubricating oil through fill port 130. The sleeve 118 is welded to and extends between the boom heel flanges 108. The annulus between the sleeve 118 and pin 116 forms a reservoir for oil providing for the storage of excess oil to minimize the effect of minor leaks. The gap between the boom heel flanges 108 and gooseneck flanges 110 is bridged in part by discs 123 which reduce the gap to a size to accommodate the O-ring support discs 122. O-ring seals 124 on discs 122 are arranged to bear against the spacer disc 123 and gooseneck flanges 110 to seal on both sides of the bearing support discs. End plates 120 are held in place by a plurality of bolts 126. Thus, the structure of the boom heel bearing provides a complete enclosure that protects against the admission of contaminates or the loss of lubricants. The floating pin 116 is held in axial position by the end plates 120 and thus needs no restricting threaded end and nut. The combination of the use of dual double flanges boom heel and goosenecks together with large bearing inserts 128 provides a large bearing area to reduce the per unit area bearing forces. Wearing forces are spread uniformly over the pin 116 by the free-floating action.

Gooseneck flanges 110 are welded to plate 134 which comprises the top plate of the vertical thrust bearing 104. The bearing 104 comprises a cylindrical bearing post 132, top plate 134 and including a bottom plate 136. The post 132 is received within a cylindrical casing 142. The bearing sliding relationship between the post 132 and casing 142 is accomplished through a plurality of bearing inserts 160.

Casing 142 is closed by an end plate 144 which is secured to the casing 142 through an adapter ring 156. Adapter ring 156 and end plate 144 are drilled to accommodate a plurality of bolt and nut combinations 152. The normal vertical thrust is taken out through a vertical thrust bearing consisting of the bottom plates 136 on post 132, cooperating with the end plate 144 on the casing 142, through the bearing insert disc 150. A shaft 138 is secured to the bottom plate 136 and passes through the end plate 144 to terminate in a threaded end that receives a nut 140. It will be noted that the nut 140 need not contact the end plate 144 during normal operating circumstances. Only under the relatively unusual situation where a vertical uplift thrust is placed on the bearing, will the nut 140 contact the undersurface of end plate 144. This configuration together with the clearance provided in the bore through plate 144 accommodating the shaft 138 insures that the post and nut 140 will not cause any binding of the bearing.

The integrity of the lower end of the enclosure is satisfied by a well 154 which surrounds the nut 140 and shaft 138. A drain 155 is incorporated into the well 154. The integrity of the enclosure is completed at the upper end by an O-ring seal 168 between cylindrical casing 142 and a depending skirt 166 that extends from the top plate 134.

The bearing is filled with oil through the use of fill plug 170. Oil enters the central cavity of the bearing post 132 and is distributed throughout the entire enclosure through a system of oil ports. The post 132 is provided with a plurality of oil ports 146 around its circumference at the approximate mid-section thereof. The oil passing through the ports 146 lubricates the bearing inserts 160. Bearing post 132 is provided with additional ports 148 in the bottom plate 136 which pass oil through the bottom plate 136 to immerse the insert 150. Insert 150 has a plurality of ports 153 which may include a spiral channel (not shown) to deliver the oil throughout the peripheral extent extend of the insert 150. The oil passing through passage 48 enters passages 145 in end plate 144 to permit the oil to pass the end plate and enter the wall 154. The structural configuration of the pivot bearing provides large bearing surfaces in both the vertical thrust bearings and side thrust bearings, which together with oil immersion and the absense of contaminates substantially eliminates any possibility of seizing or other failure.

Further protection against bearing failure is provided by a supplemental thrust bearing. The supplemental thrust bearing is accommodated between the top plate 134 and the upper surface 164 of cylindrical casing 142. Thrust ring 162 is carried by the top plate 134 and therefore rotates with respect to the casing 142. A running clearance between the bearing 162 and surface 164 is provided under normal operation. However, should excessive loads cause the post 132 to compress or wear the insert 150, or to extend the casing 142, the ring 162 will engage and slide along the upper surface 164, providing an additional thrust bearing capacity to accommodate the overload failure.

Having described my invention, I now claim:

1. A sealed bearing for supporting the end of a boom carrying a load for movement of the boom in two axes comprising:
   a boom heel bearing means for rotation of the boom about a first axis,
   a boom pivot bearing means for rotation of the boom about a second orthogonally related axis,
   said boom pivot bearing means and boom heel bearing means being structurally interconnected,
   said boom heel bearing means comprising a sealed bearing enclosure,
   a boom heel pin in said sealed bearing enclosure for relative rotational support between said boom and said boom pivot bearing.
   said pivot bearing means comprising a sealed cylindrical bearing enclosure having a generally planar end plate and a bearing post in said sealed cylindrical bearing enclosure.
   said bearing post having a sliding bearing relationship with said end plate and with the walls of said sealed cylindrical bearing enclosure,
   said pivot bearing incorporating a top plate which overlies the upper edges of said sealed cylindrical bearing enclosure,
   said bearing post comprising a cylindrical member having an open central chamber and a bottom plate,
   said bottom plate being in bearing relationship with said end plate through a bearing insert.

2. The sealed bearing according to claim 1 wherein:
   said top plate incorporates depending flanges surrounding the upper portions of said sealed cylindrical bearing enclosure,
   and seal means between said sealed cylindrical bearing enclosure and depending skirt for retaining oil in said bearing enclosure and excluding contaminates.

3. The sealed bearing according to claim 1 wherein: said bottom plate and said insert include oil passageways communicating with said central chamber of said post.

4. The sealed bearing according to claim 1 wherein:
   a top plate is connected to said bearing post and overlies the upper edges of said sealed cylindrical bearing enclosure,
   supplemental vertical thrust bearing means for providing additional vertical thrust bearing capacity effective after overload of said pivot bearing means,
   and said supplemental vertical thrust bearing means comprising a bearing surface on said top plate positioned for establishing a bearing relationship with the upper surface of said sealed cylindrical bearing enclosure upon such overload.

5. The sealed bearing according to claim 1 including:
   a pair of boom heel flanges for connection to the boom and having aligned bores for receiving said boom heel pin,
   said interconnecting structure comprising a pair of gooseneck flanges extending from said boom pivot bearing and having aligned bores for receiving said boom heel pin,
   a cylindrical sleeve extending between the innermost flanges of said pairs of flanges,
   seal means between said heel flanges and said gooseneck flanges for sealing said boom heel pin in said sealed bearing enclosure capable of retaining oil and excluding contaminates.

6. The sealed bearing according to claim 5 wherein:
   the outermost flanges of said pair of flanges are capped by end plates which close the outer end of said aligned bores.

7. The sealed bearing according to claim 1 including:
   a vertical retention member comprising a shaft extending from said post through said end plate of said sealed cylindrical cylindrical bearing enclosure,
   said shaft incorporating means for preventing upward vertical movement of said post,
   a well member surrounding said shaft and said means for preventing upward vertical movement for retaining oil in said bearing enclosure.

* * * * *

UNITED STATES PATENT OFFICE
CERTIFICATE OF CORRECTION

Patent No. 4,002,377   Dated January 11, 1977

Inventor(s) Sverre Jangaard

It is certified that error appears in the above-identified patent and that said Letters Patent are hereby corrected as shown below:

Column 6, line 38, in Claim 7, delete "cylindrical" in the first instance.

Signed and Sealed this

Twenty-ninth Day of March 1977

[SEAL]

Attest:

RUTH C. MASON
Attesting Officer

C. MARSHALL DANN
Commissioner of Patents and Trademarks